United States Patent [19]
Davies et al.

[11] Patent Number: 6,055,976
[45] Date of Patent: May 2, 2000

[54] METHOD OF PREPARING END FACES ON INTEGRATED CIRCUITS

[75] Inventors: Scott Thomas Davies, Norcross; Francis M. Mess, Smyrna; Chellappan Narayanan, Alpharetta, all of Ga.

[73] Assignee: Lucent Technologies, Inc., Murray Hill, N.J.

[21] Appl. No.: 09/015,464

[22] Filed: Jan. 29, 1998

[51] Int. Cl.[7] .................................................... B28D 1/04
[52] U.S. Cl. ........................ 125/13.01; 125/15; 451/541
[58] Field of Search .............................. 451/41, 541, 547, 451/54, 55; 125/13.01, 14, 15

[56] References Cited

U.S. PATENT DOCUMENTS

| | | | |
|---|---|---|---|
| 3,691,707 | 9/1972 | Von Arx et al. | 51/206 |
| 3,886,925 | 6/1975 | Regan | 125/15 |
| 4,217,689 | 8/1980 | Fujii et al. | 29/583 |
| 5,029,418 | 7/1991 | Bull | 51/281 R |
| 5,369,060 | 11/1994 | Baumann et al. | 437/226 |
| 5,718,615 | 2/1998 | Boucher et al. | 451/5 |
| 5,915,370 | 6/1999 | Casper | 125/13.01 |

*Primary Examiner*—Timothy V. Eley
*Assistant Examiner*—Dung Van Nguyen

[57] ABSTRACT

A method for preparing operative end faces of integrated circuit chips or dies utilizes a beveled cutting blade to impart a desired contact angle to the operative end faces of the chip. The method includes the steps of mounting feet on the chip, trimming the feet where necessary, mounting the chip on a fixture with tape, cutting the end faces, and removing the chip from the fixture.

8 Claims, 2 Drawing Sheets

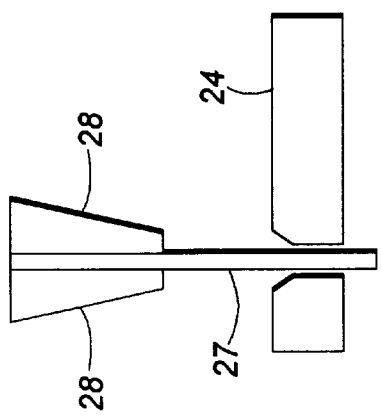
FIG. 3B (PRIOR ART)
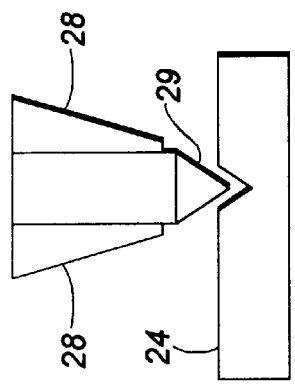
FIG. 3A (PRIOR ART)
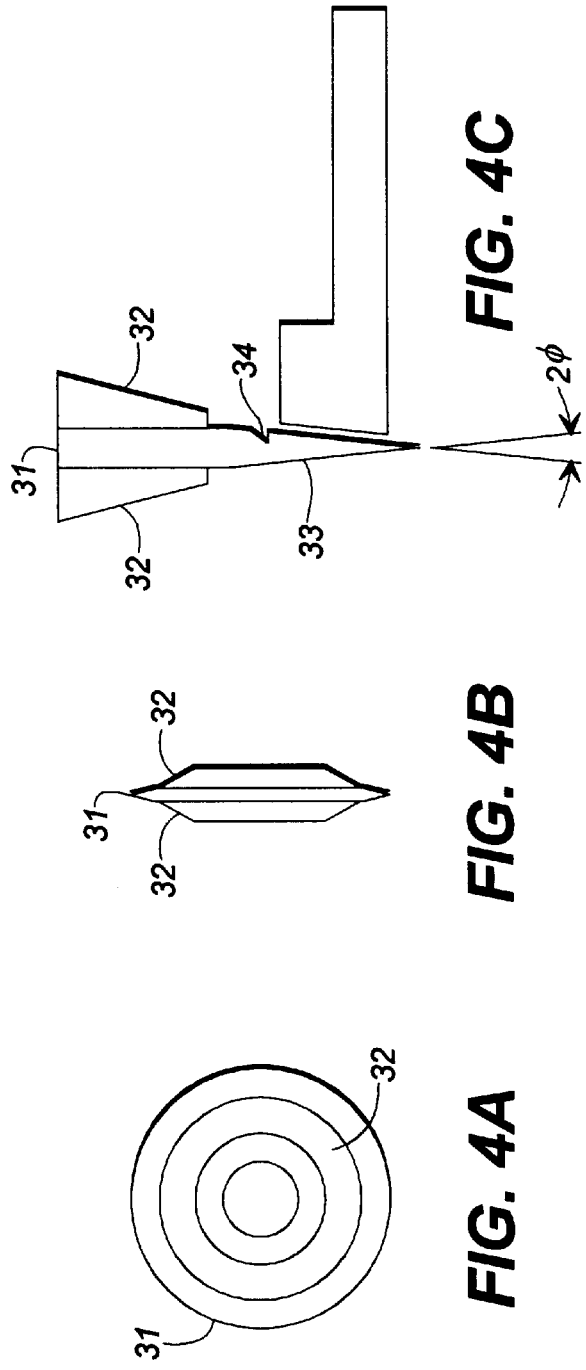
FIG. 4C
FIG. 4B
FIG. 4A

METHOD OF PREPARING END FACES ON INTEGRATED CIRCUITS

FIELD OF THE INVENTION

This invention relates to a method and apparatus for preparing optical integrated circuits for packaging and, more particularly, to a method and apparatus for dicing and preparing integrated circuit dies or chips for connection to optical fibers.

BACKGROUND OF THE INVENTION

Optical integrated circuits (OIC's) generally are fabricated on silicon wafers which are planar in structure. Several oxide layers are usually deposited on the wafers, and the integrated circuits themselves actually reside in the oxide layers. The usual practice is to form a plurality of such circuits on the wafer, and then to cut individual dies containing circuits therefrom (dicing). Optical signals carried by optical fibers are connected to the circuit on the silicon device, with the input signal entering the device at one end and exiting the device at the other, after processing by the integrated circuit. Connection of the fibers to the OIC die or chip involves an interface between each fiber and the chip, and it is common practice to terminate each fiber to be connected with a V-groove chip assembly made of silicon or ceramic which provides a means to align and attach the fibers to the inputs and outputs of the OIC chip. A 90° end face on the silicon chip and on the OIC chip or die would be the easiest to align and attach. However, the flat 90° faces would produce large amounts of back reflection, resulting in serious and highly undesirable signal degradation.

It is common practice in the prior art arrangements to impart an angle to the input or output face of the OIC die, and a corresponding complementary angle to the end of the V-groove terminating chip to minimize back reflection. The particular angle of the faces must be chosen with care to insure a proper physical connection and acceptable back reflection levels. thus, the angle may vary from five (5°) to twelve (12°) degrees, for example, depending on the ultimate function of the OIC chip, but it has been found that eight degrees (8°) is usually the minimum angle allowable to reduce back reflection to acceptable levels. Angles greater than eight degrees will reduce back reflection still more, but angles greater than ten (10) to twelve (12) degrees involve other manufacturing concerns, such as wastage of material, and, at least up to now, increased processing time which is economically undesirable. For angles less than eight degrees, back reflection increases rapidly, while for angles greater than twelve degrees, too much material has to be removed by current lapping and polishing processes.

Dicing, a commercially available process, has been used by the integrated circuit industry for many years, and has also been used in the manufacture of Optical Application Specific Integrated Circuits (OASIC) such as, for example, dense wavelength division multiplexers (DWDM's). Dicing usually involves the use of an abrasive-coated blade rotating at high speeds in the presence of a coolant fluid. Although the blade dimensions and characteristics may vary, typically the blade is planar and quite thin, with no included angle between the front and back faces of the blade. Such a rotating blade is used to separate individual OIC dies from the silicon wafer. It is a primary concern that the damage to the substrate that can result from this dicing operation be minimized. Such damage can result in poor device performance, or even catastrophic failure such as by fracture. Present day techniques for minimizing such damage call for making multiple cut passes in the same location using different blades. Thus, a beveled blade may be used to make a preliminary cut of less than full depth followed by a straight blade which makes the through cut. Angled blades typically leave less subsurface damage on the top surface of the wafer or die than do straight blades. Thus, a beveled blade makes a first cut which is wider than the following through-cut by a straight blade. The net effect of such a technique is a reduction in damage to the circuit substrate.

After the die or chip has been cut from the wafer, connector feet are mounted on the die and the rotating blade is used to trim the foot to the desired dimensions. The desired angular interface is then formed by lapping and polishing, which involves the use of an abrasive carrying slurry and some sort of mechanism to generate relative motion between the workpiece, e.g., the OASIC device, and a work surface, i.e., the lapping or polishing plate. The desired interface angle, such as eight degrees, is formed during the lapping and polishing, by the precise removal of material. The removal of material is a relatively slow process, and requires extensive training and a high level of skill on the part of the operator. For a smoothly operating production line, inclusion of an individual into the line, as with the prior art process, is, for the foregoing reasons, highly undesirable. In addition, the lapping and polishing equipment is both expensive and requires a high degree of maintenance, thereby adding to the cost involved in producing the desired end result. Furthermore, the process as thus far described requires several work stations and several operators with varying levels of required skill, thereby making the process, especially from a production standpoint, both slow and expensive. As will be discussed more fully hereinafter, the entire process involves approximately eleven steps extended over several hours which, in a production environment, means that the lapping and polishing steps govern the speed of the production line creating a most undesirable slow-down and a most undesirable increase in production costs.

SUMMARY OF THE INVENTION

The present invention is a process for preparing optical integrated circuit dies or chips for connection and/or packaging, which drastically reduces the production time, number of involved personnel, and number of work stations that heretofore have been necessary, while at the same time, producing a uniformity of results that has not been a characteristic of prior art processes.

In a preferred embodiment of the invention, after a die containing the integrated circuit has been separated from the wafer, feet are mounted thereon, as by epoxy, to provide a matching surface for the V-groove chip terminations of the optical fibers. The die is then mounted to, preferably, a tape mount, which is commonly used in the prior art. After mounting, the die and foot are cut by a rotating beveled blade having an included angle of from sixteen to twenty-four degrees, thereby forming an eight to twelve degree angle on the end faces of the die and the foot, after which the mounting tape is removed from the completed die. It has been found that such an angled blade produces operative faces of exceptional smoothness.

It often is the case that when the feet are attached, they will overhang the edges of the die. Thus, in an alternative embodiment, after mounting of the die, the beveled wheel is used to trim the feet to conform to the die dimensions, after which the die is rotated ninety degrees and the end faces are formed.

As will be apparent from the following detailed description, the processing steps of the present invention are considerably fewer than what has heretofore been the case with the prior art processes, nor does the process require more than one work station and one operator. Further, the process does not require the exercise of skill or judgment on the part of the operator. The elapsed time for performance of the entire process of the invention in order of magnitude less than for the prior art process, as will become clear hereinafter, and acceptable operative end faces are produced.

These and other features, advantages, and details of the present invention will be more apparent from the following detailed description, read in conjunction with the accompanying drawings.

DESCRIPTION OF THE DRAWINGS

FIG. 3A is an elevation view of the first cutting arrangement in a prior art two-step dicing method;

FIG. 3B is an elevation view of the second cutting step apparatus in the two-step dicing process;

FIG. 4A is a side elevation view of the cutting wheel used in the method of the present invention;

FIG. 4B is a front elevation view of the cutting wheel of FIG. 4A; and

FIG. 4C is an elevation view of the cutting step of the present invention.

DETAILED DESCRIPTION

Figure 1:
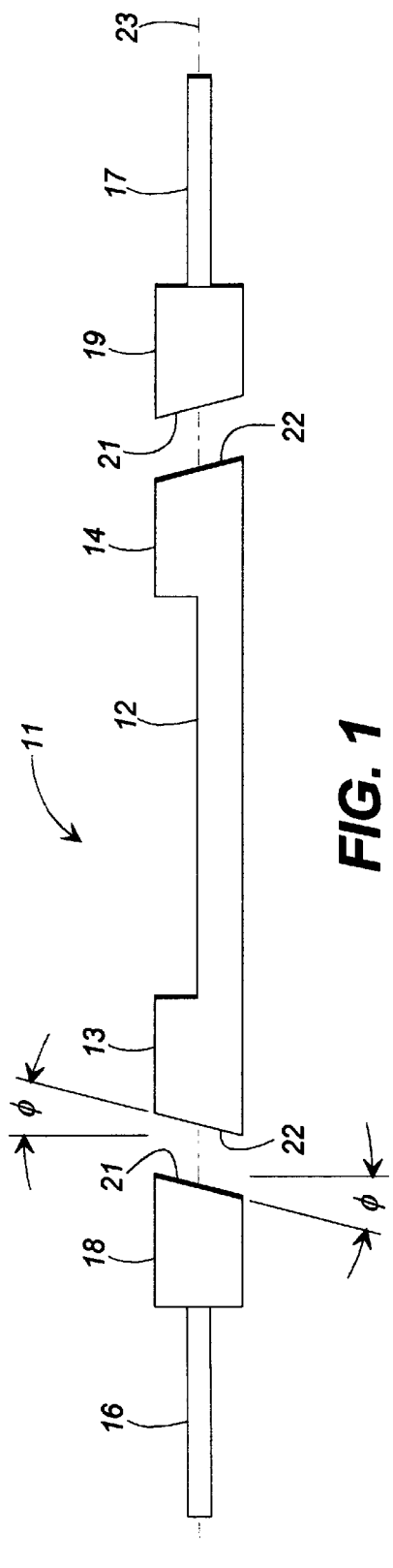
FIG. 1 is a side elevation view of an optical integrated circuit die or chip and connections thereto.

In FIG. 1 there is shown a die or chip 11 which comprises a planar silicon member 12, which contains an optical integrated circuit, not shown, and which has, at each end, a connector foot 13, 14, preferably of glass or silicon. Optical fiber connections to the chip 11 are made with optical fibers 16, 17, terminated in V-groove chips 18, 19, respectively. As was discussed previously, it is desirable for the operative interface between each terminating chip 18, 19 and the chip 11 be at an angle to reduce back reflections. If the angle $\phi$ as shown in FIG. 1 is zero degrees (0°) the face 21 of each terminating chip 18, 19 and the face 22 of the chip 12 and foot 13, 14 is normal to the axis 23, then there will be a large amount of signal reflection at the interface and a consequent unacceptable signal degradation. On the other hand, if the angle $\phi$ is approximately forty-five degrees (45°) or more, the end faces function as mirrors and deflect the signal to a new path at approximately right angles to its original direction of propagation. Thus, the angle $\phi$ at the interface can fall within the range of 0° to 45°, but the outer portions of the range can produce unacceptable back-reflection on the one hand or too great signal deflection on the other hand. It has been found that when the angle $\phi$ is within a range of eight degrees (8°) to twelve degrees (12°), the signal loss due to reflection or deflection is within acceptable limits. Preferably, the angle $\phi$ should be in the low end of the range to eliminate the necessity of creating too much waste material, thus 8° is to be preferred.

Figure 2B:
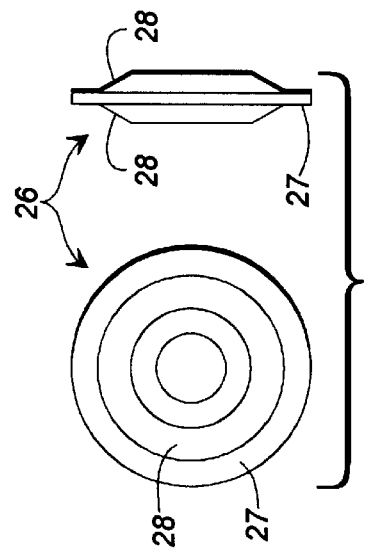
FIG. 2B is a composite view of the cutting blade used in the arrangement of FIG. 2A.
Figure 2A:
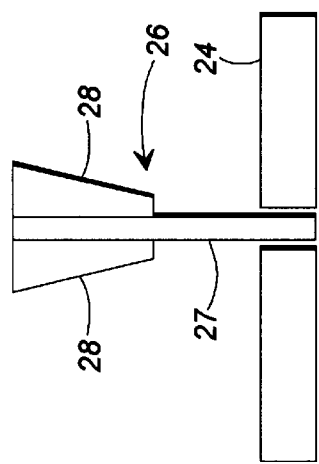
FIG. 2A is an elevation view of the prior art method of dicing a silicon wafer having integrated circuit chips incorporated therein.

Heretofore, in order to achieve the interface configuration shown in FIG. 1, it has been the practice to make a straight ninety degree (90°) cut through the silicon wafer 24, which contains a plurality of individual dies or chips, by means of a straight, thin rotating diamond saw 26. Such a process, known as dicing, is shown in FIG. 2A, and the diamond saw 26, which consists of a blade 27 held between two flanges 28, is shown in FIG. 2B. After a die or chip 11 has been separated from the wafer, the feet 13 and 14 are mounted thereon with, for example, epoxy cement, and any overhang of a foot is trimmed off by the blade 27. In FIGS. 3A and 3B, the dicing process is shown as a two step operation which is more often used for IC's instead of OIC's, in which a beveled blade 29 is used to make a V-shaped cut in the wafer 24, as shown, after which the straight blade 27 makes the dicing cut. This two-step dicing process has been found to reduce damage to the wafer 24 in the area of the cut by a considerable amount.

After the feet 13 and 14 have been trimmed, it is the current practice in the prior art to lap and polish the end faces 22 of the die 12 and a feet 13 and 14 until the desired interface angle $\phi$ has been achieved. Lapping and polishing is a time consuming process, as well as being labor intensive. On average, lapping and polishing requires approximately one hour per device in direct labor time in addition to time-intensive set-up and clean up process steps. In addition, lapping and polishing requires the design and fabrication of device-specific fixtures for devices of differing geometrics. However, lapping and polishing does produce end face surfaces of high quality that are substantially damage free.

The present invention does not, usually, produce end faces of the quality achievable with lapping and polishing. It does, however, produce end faces that are acceptable for normal usage in a drastically reduced elapsed production time per device. In FIGS. 4A, 4B, and 4C are shown the dicing wheel 31 held between flanges 32 and the manner in which it is used to impart an angle $\phi$ to the end faces 22 of die or chip 11. Wheel 31 has angular cutting sides 33 and 34, defining an included angle of $2\phi$, each being at an angle $\phi$ to the vertical, as shown in FIG. 4C. As discussed hereinbefore, the angle $\phi$ may be from 8° to 12°, with 8° being preferable.

The prior art process of preparing the end faces of a chip or die 11, after the die has been removed from the silicon wafer involves the steps of attaching the feet 13 and 14; trimming the feet; wax bonding; mounting the die on a fixture; lapping, cleaning, and polishing one end face; lapping, cleaning, and polishing the other end face; removing from the fixture and de-waxing and cleaning. The process involves from two to four individual operators and requires a high degree of skill for the operators doing the lapping and polishing. At least two, and usually more, fixtures are involved, each requiring individual mounting of the dies. The entire process, on a per chip basis, is approximately two hours, although this figure is somewhat misleading, since the lapping and polishing steps can take as much as ten hours, whether one or sixteen chips are being done simultaneously. The end product of the above listed process steps is a die having end faces 21,22 of superior quality. On the other hand, the process is an expensive one, being labor intensive and time consuming throughout.

The process of the present invention requires fewer steps, is far less labor intensive, and requires approximately three-quarters of an hour (¾ hr.) per device. Thus, the production bottleneck resulting from the lapping and polishing steps is eliminated, and the devices are far more economically manufactured. The process steps of the present invention are, after the die has been removed from the wafer, attaching the feet 13 and 14, tape mounting the die to the cutting fixture; trimming the feet, which can include the step of rotating the die 90° to trim the feet along another axis; cutting the operative end faces of the die with a beveled blade having a cutting face angled at 8° to 12° to impart an 8° to 12° angle on the end face; and removing the die from the tape. In the first step, the feet 13 and 14 are affixed to the ends of the die or chip by suitable means, such as an epoxy cement. In the second step, the tape is a sheet of suitable flexible plastic material which has an adhesive surface and which is held in stretched condition by the cutting fixture. The die is placed on the adhesive surface and held in place thereby. The feet which, after mounting to the die, may overhang the edges thereof, are trimmed by the cutting blade along one axis, and then the chip is rotated 90° in the fixture and the feet are trimmed along the second axis by the cutting blade. This trimming step is only necessary when there is an overhang. The blade itself preferably is made of a resinoid material impregnated with diamond dust having a particle size of thirty microns (30 μm). In cutting the end faces, it has been found that there are several parameters which may be optimized to produce quality end faces. With the 30 μm beveled cutting blade and an included angle of 16°, a blade speed of approximately thirty thousand (30k) RPM and a feed rate (transverse movement of the blade across the end face) of approximately one and one-half millimeters per second (1.5 mm/s), high quality end faces are produced having a back reflection (BR) of less than −56.4 dB, which is well within the allowable BR limits. The efficiency of production with these parameters is maximized, being far greater than the prior art methods, which include lapping and polishing. It has also been found that cutting the end faces in two passes, where substantially equal volumes of material are removed with each pass, has the advantages of placing less stress on the die being cut with only a small incremental increase in production time. Removal of the die or chip from the tape after the formation of the end faces simply entails pulling the die off of the adhesive surface of the tape and cleaning off any residue of adhesive.

The method of forming end faces on the die or chip in accordance with the steps enumerated hereinbefore requires only one semi-skilled operator and one, or at most two, fixtures. As pointed out in the foregoing, the elapsed time per finished chip is drastically reduced over prior art methods, and the end results are optically well within allowed limits. The foregoing description and discussion has been for purposes of illustrating the principles of the present invention in a preferred embodiment thereof. It can readily be seen that the method of the present invention when followed, is far more economical than prior art methods while producing comparable results.

In concluding the detailed description, it will be obvious to those skilled in the art that many variations and modifications may be made to the preferred embodiment or, more accurately, the preferred method, without substantial departure from the principles of the present invention. For example, the process may be used for optical fiber arrays or other similar optical devices, such as silicon, ceramic, or Ga As based devices. All such variations and modifications are intended to be included herein as being within the scope of the present invention as set forth hereinafter in the claims. Further, in the claims, the corresponding materials, structures, acts, and equivalents of all means or step plus function elements are intended to include any structure, material, or acts for performing the functions with other claimed elements as specifically claimed.

We claim:

1. A method of preparing end faces of an optical integrated circuit chip for connection to other circuit members, the chip having ends, said method comprising:

affixing feet to the ends of the chip;

mounting the chip on a cutting fixture;

forming end faces of the chip by imparting an angle of from 8° to 12° to the ends of the chip and to the corresponding feet by through-cutting them with a rotating beveled blade having an included angle of from 16° to 24°; and removing the chip from the cutting fixture.

2. The method as claimed in claim 1, wherein the angle imparted to the end faces is approximately 8°.

3. The method as claimed in claim 1 and further including the step of trimming the feet after mounting the chip on the cutting fixture.

4. The method as claimed in claim 3, wherein the step of trimming the feet comprises:

trimming the feet along a first axis, rotating the chip approximately 90° relative to the first axis; and trimming the feet along a second axis.

5. The method as claimed in claim 1, wherein the step of through-cutting comprises making a first cut adjacent each one of the ends of the chip to remove a volume of material and making a finish cut through the chip adjacent each of the ends to remove an approximately equal volume of material.

6. The method as claimed in claim 1, wherein a rotational speed of the beveled blade is approximately thirty thousand (30k) RPM.

7. The method as claimed in claim 6, wherein a feed rate of the beveled blade is approximately one and one-half millimeters per second (1.5 mm/s).

8. The method as claimed in claim 1, wherein the step of mounting the chip on a cutting fixture comprises placing the chip on a sheet of plastic tape having an adhesive surface and mounting the sheet of plastic tape to the cutting fixture.

* * * * *